United States Patent
Shepherd et al.

(10) Patent No.: US 11,062,562 B2
(45) Date of Patent: Jul. 13, 2021

(54) SYSTEM AND METHOD FOR UTILIZING VOUCHERS TO FACILITATE PURCHASES IN ASSOCIATION WITH A GAMING ESTABLISHMENT RETAIL ACCOUNT

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 116 days.

(21) Appl. No.: 16/579,115

(22) Filed: Sep. 23, 2019

(65) Prior Publication Data

US 2021/0090389 A1     Mar. 25, 2021

(51) Int. Cl.
*G07F 17/32* (2006.01)
*G06Q 20/20* (2012.01)
*G06Q 20/04* (2012.01)

(52) U.S. Cl.
CPC ..... *G07F 17/3244* (2013.01); *G06Q 20/0457* (2013.01); *G06Q 20/20* (2013.01); *G07F 17/3239* (2013.01); *G07F 17/3241* (2013.01)

(58) Field of Classification Search
USPC .......................................................... 463/25
See application file for complete search history.

(56) References Cited

U.S. PATENT DOCUMENTS

| | | | |
|---|---|---|---|
| 7,147,149 B2 | 12/2006 | Giraldin et al. | |
| 8,374,932 B2 | 2/2013 | Marchetti et al. | |
| 8,407,141 B2 | 3/2013 | Mullen et al. | |
| 8,425,323 B2 | 4/2013 | Fiden et al. | |
| 8,958,534 B2 | 2/2015 | Bodman | |
| 9,552,573 B2 | 1/2017 | Kulpati et al. | |
| 9,928,502 B2 | 3/2018 | Curtin et al. | |
| 1,031,894 A1 | 6/2019 | Tsutsui | |
| 1,036,076 A1 | 7/2019 | Higgins et al. | |
| 2006/0068897 A1 | 3/2006 | Sanford et al. | |
| 2008/0085763 A1 | 4/2008 | Randhawa | |
| 2010/0222132 A1 | 9/2010 | Sanford et al. | |
| 2016/0171830 A1 | 6/2016 | Curtin et al. | |
| 2017/0092054 A1 | 3/2017 | Petersen et al. | |
| 2017/0193748 A1 | 7/2017 | Arnone et al. | |
| 2019/0096175 A1 | 3/2019 | Higgins et al. | |
| 2019/0102985 A1 | 4/2019 | Higgins et al. | |
| 2019/0188960 A1 | 6/2019 | Miri et al. | |
| 2019/0188963 A1 | 6/2019 | Higgins et al. | |
| 2019/0197526 A1 | 6/2019 | Higgins et al. | |
| 2020/0111280 A1 * | 4/2020 | Cleveland | G07F 17/3209 |
| 2020/0302740 A1 * | 9/2020 | Cleveland | G07F 17/3225 |
| 2020/0302746 A1 * | 9/2020 | Cleveland | G06Q 20/3278 |

OTHER PUBLICATIONS

Financial Crimes Enforcement Network 31 CFR Parts 1010 and 1022, Department of the Treasury, 69 pages.

* cited by examiner

*Primary Examiner* — Pierre E Elisca

(74) *Attorney, Agent, or Firm* — Neal, Gerber & Eisenberg LLP

(57) ABSTRACT

A system and method that utilize a ticket voucher complete one or more purchases of goods and/or services from a retail establishment.

20 Claims, 4 Drawing Sheets

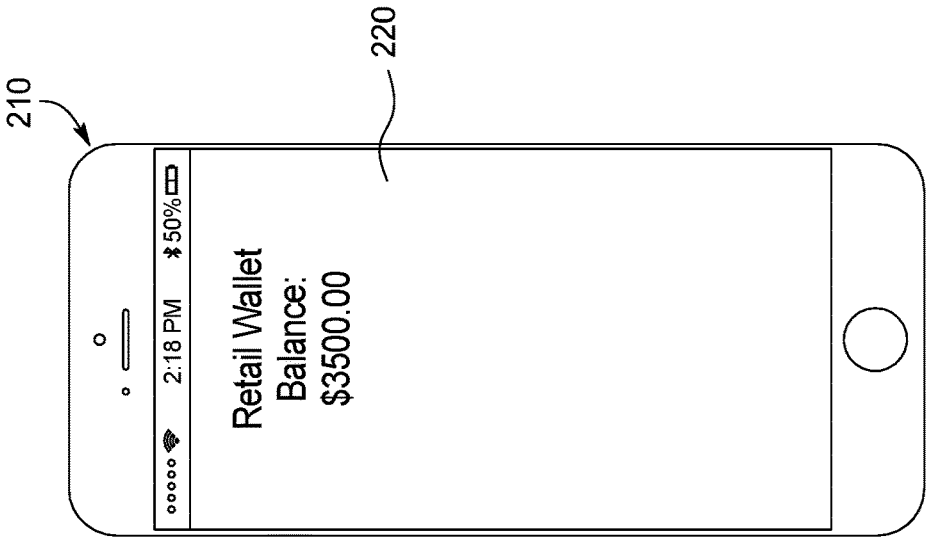
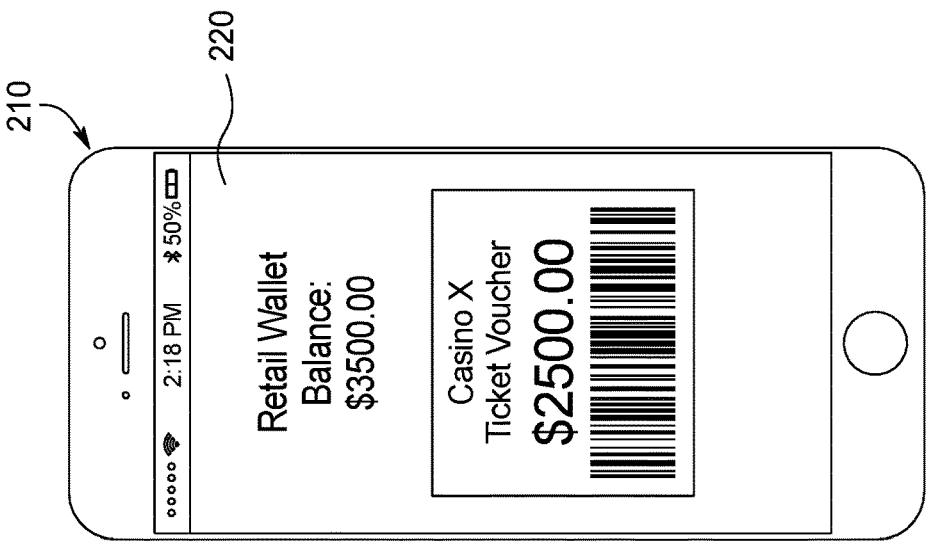
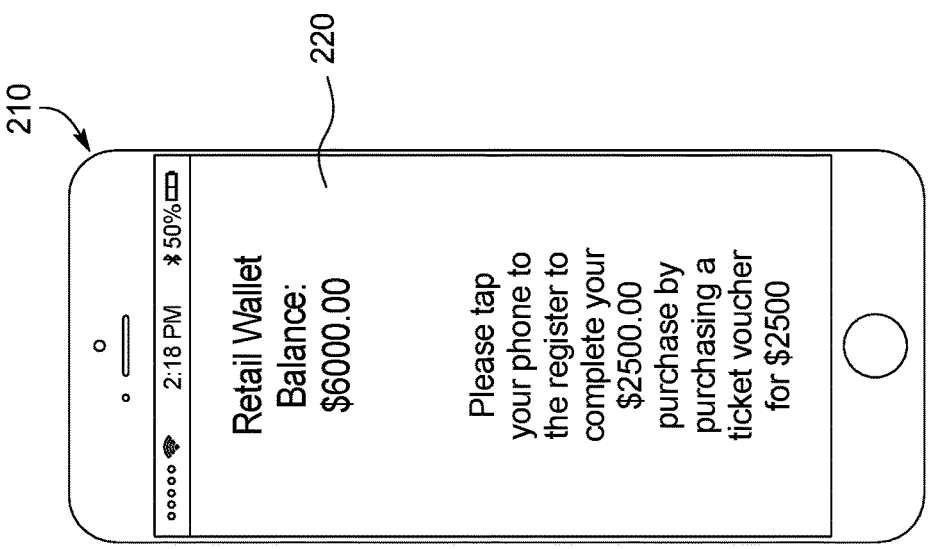

SYSTEM AND METHOD FOR UTILIZING VOUCHERS TO FACILITATE PURCHASES IN ASSOCIATION WITH A GAMING ESTABLISHMENT RETAIL ACCOUNT

TECHNICAL FIELD

The technical field of the present disclosure is that of systems and methods that utilize utilizes a ticket voucher to complete one or more purchases of goods and/or services from a retail establishment.

BACKGROUND

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a system including a processor and a memory device that stores a plurality of instructions. When executed by the processor in association with an attempted purchase at a point-of-sale terminal of a retail system, the instructions cause the processor to determine, based on a balance of a gaming establishment account associated with a user and an amount of the attempted purchase, if a ticket voucher creation event occurs. When executed by the processor responsive to the ticket voucher creation event occurring, the instructions cause the processor to cause a ticket voucher to be created, and transfer an amount of funds associated with the amount of the purchase from the gaming establishment account to being associated with the ticket voucher.

In certain embodiments, the present disclosure relates to a system including a processor and a memory device that stores a plurality of instructions. When executed by the processor following a creation of a ticket voucher associated with an amount of funds transferred from a gaming establishment account in association with a purchase at a point-of-sale terminal of a retail system, the instructions cause the processor to receive, via an input device, data associated with a redemption of the ticket voucher. When executed by the processor responsive to an authorization of the redemption of the ticket voucher, the instructions cause the processor to initiate a transfer of the amount of funds associated with the ticket voucher to an account associated with the retail system.

In certain embodiments, the present disclosure relates to a method of a system, the method including, in association with an attempted purchase at a point-of-sale terminal of a retail system, determining, by a processor and based on a balance of a gaming establishment account associated with a user and an amount of the attempted purchase, if a ticket voucher creation event occurs. Responsive to the ticket voucher creation event occurring, the method includes causing a ticket voucher to be created, and transferring, by the processor, an amount of funds associated with the amount of the purchase from the gaming establishment account to being associated with the ticket voucher.

Additional features are described herein, and will be apparent from the following Detailed Description and the figures.

BRIEF DESCRIPTION OF SEVERAL VIEWS OF THE DRAWINGS

FIGS. 2A, 2B, and 2C are example graphical user interfaces displayed on a mobile device in connection with utilizing a virtual ticket voucher procured in association with a retail purchase.

DETAILED DESCRIPTION

Figure 1:
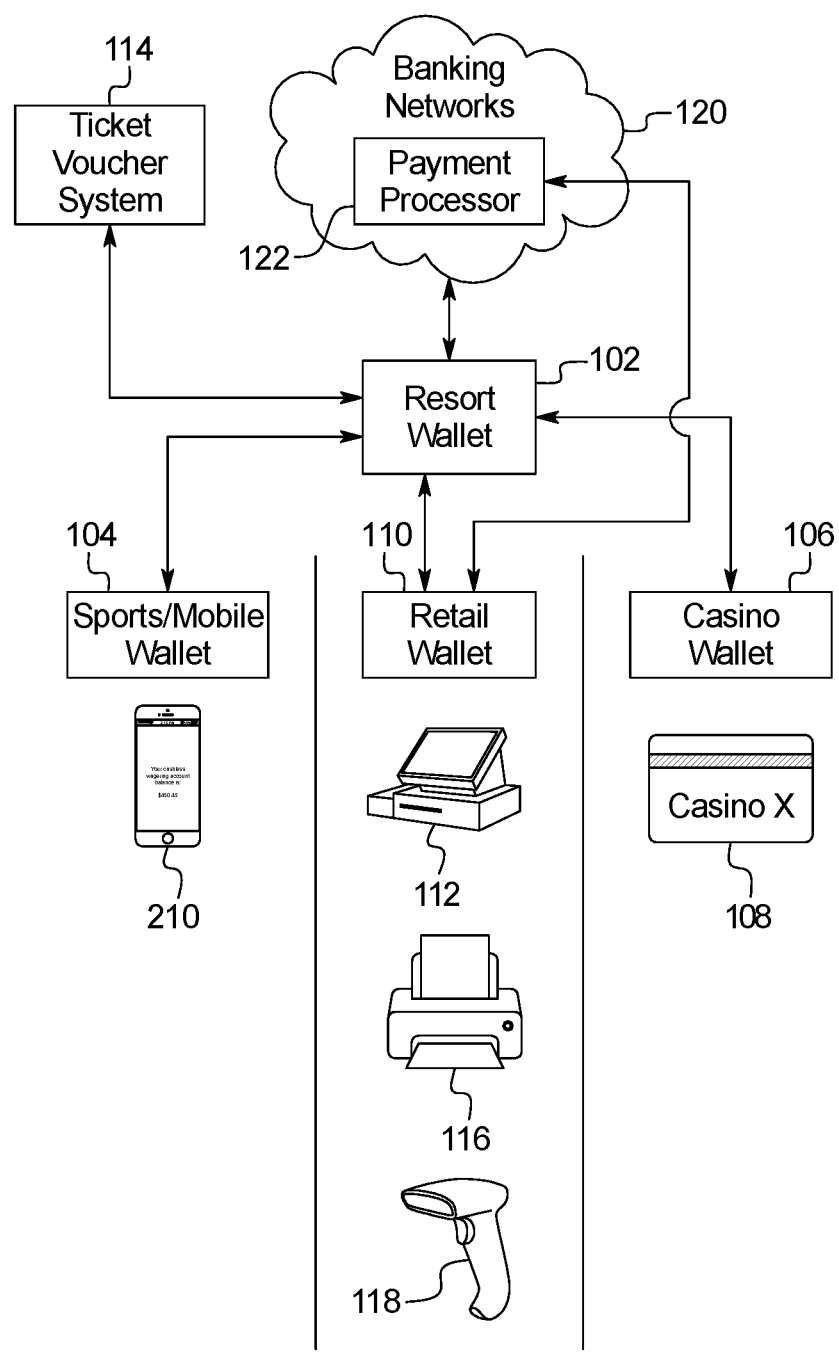
FIG. 1 is an example configuration of the architecture of a plurality of different components of the system disclosed herein.

In various embodiments, the system and method disclosed herein utilizes a ticket voucher to complete one or more purchases of goods and/or services from a retail establishment.

In certain embodiments, the system enables a user to procure a ticket voucher (i.e., an anonymous bearer instrument redeemable for cash, game play on a gaming establishment device, and/or to fund certain transactions, such as transactions associated with a retail establishment) using an amount of funds maintained in a gaming establishment account associated with the user. In these embodiments, after establishing and funding a gaming establishment account, such as a gaming establishment retail account, the system enables a user to purchase a ticket voucher with or using part or all of the funds from a gaming establishment account. In different embodiments, the system enables a user to utilize one or more devices, such as an electronic gaming machine ("EGM"), a kiosk, a gaming establishment interface or a mobile device running an application associated with the gaming system, to facilitate the transfer of an amount of funds from the maintained gaming establishment account to a ticket voucher system in order to purchase a ticket voucher.

In certain embodiments, the system enables a user to procure a ticket voucher using an amount of funds independent of any funds maintained in any gaming establishment account associated with the user. In such embodiments, the system enables a user to deposit an amount of cash (or other funds) in association with one or more devices, such as an EGM, a kiosk, or a gaming establishment interface in exchange for the issuance of a ticket voucher by the ticket voucher system.

It should be appreciated that regardless of how a ticket voucher is obtained, such a ticket voucher is associated with ticket voucher identification information, such as a ticket voucher identifier and an amount of funds associated with the ticket voucher identifier. Moreover, in different embodiments, such an obtained ticket voucher may take the form of a paper ticket voucher or a virtual ticket voucher. In these embodiments, a virtual ticket voucher is no different than a paper ticket voucher in the sense that users are free to use such virtual ticket vouchers to redeem for cash, to fund game play on a gaming establishment device, and/or to fund certain retail transactions with a retail system.

Following the procurement of a ticket voucher, the system enables the user to utilize the obtained ticket voucher to complete a retail purchase with a retail establishment. In certain embodiments, the retail purchase is completed using the purchased (or otherwise obtained) ticket voucher as the sole purchase funding instrument in the retail transaction. In other embodiments, in view of spending limits imposed by certain regulations on individual pre-paid cards and in view of certain purchases costing more than these spending limits, the retail purchase is completed using a combination of one or more pre-paid cards (to fund the amount of the purchase up to the imposed spending limit) and one or more purchased (or otherwise obtained) ticket vouchers (to fund the amount of the purchase above the imposed spending limit on the pre-paid card) as the purchase funding instruments in the retail transaction.

In certain embodiments wherein the ticket voucher utilized in the attempted retail transaction is in paper form, the purchase is completed via the user presenting the obtained paper ticket voucher to the retail establishment for the purchase of goods and/or services. In these embodiments, following the presentation of the paper ticket voucher, a component of the retail system, such as a point-of-sale terminal, captures data associated with the paper ticket voucher and communicates with a ticket voucher system to confirm that the presented paper ticket voucher is associated with an adequate amount of funds for the intended purchase. If the ticket voucher system indicates that the presented paper ticket voucher lacks an adequate amount of funds for the intended purchase, the retail system denies the sale transaction of the goods and/or services and the retail establishment does not take possession of the paper ticket voucher. On the other hand, if the ticket voucher system confirms the presence of an adequate amount of funds associated with the presented paper ticket voucher, the retail system authorizes the sale of the goods and/or services and the retail establishment takes possession of the presented paper ticket voucher. In certain embodiments, since the paper ticket voucher is redeemable for cash, the retail establishment can subsequently redeem the obtained paper ticket voucher for a corresponding amount of cash at a redemption kiosk or gaming establishment interface, such as a casino cage. In certain embodiments, if the retail establishment has access to a voucher validation unit, the retail establishment can scan each paper ticket voucher to redeem that obtained paper ticket voucher by initiating a fund transfer wherein an amount of funds corresponding to the amount of the redeemed paper ticket voucher is transferred from a gaming establishment account which backs the ticket voucher system, such as a banking account associated with the gaming establishment to a retail establishment account, such as a banking account associated with the retail establishment, and the ticket voucher system reduces the amount of funds associated with the ticket voucher identifier of the redeemed paper ticket voucher to account for the fund transfer.

In certain embodiments wherein the ticket voucher utilized in the attempted retail transaction is in virtual form, the purchase is completed via transferring virtual ticket voucher data from a gaming establishment account associated with the user to an account associated with the retail establishment. In these embodiments, following the procurement of a virtual ticket voucher, the user presents a retail wallet identity (i.e., a physical card associated with a gaming establishment account associated with a virtual ticket voucher or a mobile device running a mobile device application associated with a gaming establishment account associated with a virtual ticket voucher or a mobile device running a mobile device application associated with a virtual ticket voucher independent of any gaming establishment account) at an applicable terminal of the retail system, such as a point-of-sale terminal. In certain embodiments, the user then utilizes one or more interfaces, such an application running on a mobile device or a component of the point-of-sale terminal, to identify a virtual ticket voucher maintained in association with the gaming establishment account which is to be transferred to the retail system to complete the intended purchase. In certain embodiments, the system automatically procures a virtual ticket voucher (from funds maintained in associated with a gaming establishment account), identifies the procured virtual ticket voucher and transfers data associated with that virtual ticket voucher to facilitate an attempted retail transaction. In these embodiments, upon receiving data associated with a virtual ticket voucher to fund the attempted retail transaction, the retail system communicates with the ticket voucher system to confirm that the identified virtual ticket voucher is associated with an adequate amount of funds for the intended purchase. If the ticket voucher system confirms the presence of an adequate amount of funds associated with the identified virtual ticket voucher associated with the gaming establishment account, the retail system authorizes the sale of the goods and/or services and communicates data to the ticket voucher system to authorize the transfer of the identified virtual ticket voucher from being maintained in association with the gaming establishment account of the user to being maintained in association with an account of the retail establishment. In these embodiments, since the virtual ticket voucher is a bearer instrument, the retail establishment can subsequently redeem the obtained virtual ticket voucher by initiating a fund transfer wherein an amount of funds corresponding to the amount of the redeemed virtual ticket voucher is transferred from a gaming establishment account which backs the ticket voucher system, such as a banking account associated with the gaming establishment to a retail establishment account, such as a banking account associated with the retail establishment, and the ticket voucher system reduces the amount of funds associated with the ticket voucher identifier of the redeemed virtual ticket voucher to account for the fund transfer. In another embodiment, the user informs the retail point of sale terminal of the validation number of the virtual ticket voucher that they hold and the point of sale terminal can initiate a redemption transaction with the gaming establishment ticketing system (i.e., the virtual ticket voucher is automatically redeemed when the user attempts to purchase a good and/or service at a retail establishment).

It should be appreciated that utilizing ticket vouchers to complete retail purchases reduces the amount of cash which a user may carry to be used for purchasing goods and/or services and thus diminishes the risks that such cash may be lost or stolen (which is associated with various costs to the player and the gaming establishment) prior to the retail purchase. As such, the utilization of ticket vouchers to complete one or more retail transactions (and without utilizing any physical forms of currency) expands the cashless eco-system certain gaming systems strive for and thus overcomes various security concerns and labor cost concerns associated with cash-based retail transactions. Moreover, completing retail purchases utilizing purchased ticket vouchers with funds associated with one or more gaming establishment accounts maintained for a user enables the user to obtain certain benefits associated with use of such funds while adhering to various financial regulations associated with such different accounts. Furthermore, the system disclosed herein increases the efficiency of fund moving between the gambling space of a gaming establishment and the retail space of the gaming establishment as players have the freedom to more easily spend their winnings at the gaming establishment without having to convert their winnings to cash as much and as operators benefit from minimizing the need to convert gaming tickets to physical cash (which is relatively expensive for the casino to maintain). Additionally, the utilization of ticket vouchers to complete one or more retail transactions (and without utilizing any physical forms of currency) reduces the use of credit cards within the retail establishments of a gaming establishment and thus reduces credit card processing fees (and the associated costs which may be passed onto retail consumers).

System Accounts

In various embodiments, the system disclosed herein includes various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (i.e., cashless wagering wallets) and gaming establishment retail accounts (i.e., gaming establishment retail wallets) associated with or otherwise maintained for a user, such as a player, collectively form a resort or enterprise account (i.e., an integrated resort or gaming establishment fund management wallet) that the user, such as a player, may access to transfer funds and/or view balance information amongst the various accounts associated with or otherwise maintained for the player or user. As such, the system includes one or more gaming establishment fund management systems that are each associated with or otherwise maintain one or more gaming establishment fund management accounts for a user.

In various embodiments, the gaming establishment fund management system includes one or more cashless wagering systems that are each associated with or otherwise maintain one or more cashless wagering accounts. In certain embodiments, the gaming establishment fund management system includes a first cashless wagering system that maintains a first cashless wagering account, wherein a user utilizes a mobile device application running on a mobile device to facilitate the electronic transfer of any funds between this first cashless wagering account and an EGM. For example, as seen in FIG. 1, the resort wallet 102 includes or is otherwise in communication with a Sports/Mobile Wallet 104 (i.e., a first cashless wagering account maintained by a first cashless wagering system) accessible via the mobile device 210 running a mobile device application as described herein.

In certain embodiments, the gaming establishment fund management system additionally or alternatively includes a second cashless wagering system that maintains a second cashless wagering account associated with a physical instrument, such as a user issued magnetic striped card. In these embodiments, a user utilizes the physical instrument (e.g., via inserting the card into a player tracking unit associated with an EGM) to facilitate the electronic transfer of any funds between this second cashless wagering account and the EGM. Continuing with the example, as seen in FIG. 1, the resort wallet 102 also includes or is otherwise in communication with a Casino Wallet 106 (i.e., a second cashless wagering account maintained by a second cashless wagering system) accessible via a physical instrument, such as a user issued magnetic striped card associated with the second cashless wagering system 108 or a mobile device associated with the second cashless wagering system.

In various embodiments, in addition to or an alternative of maintaining one or more cashless wagering accounts via one or more cashless wagering systems, the gaming establishment fund management system includes one or more gaming establishment retail systems, such as a system of a retail establishment of a gaming establishment or a system of a third-party retail establishment separate from but otherwise associated with the gaming establishment. In these embodiments, each gaming establishment retail system maintain one or more gaming establishment retail accounts. Such a gaming establishment retail account (i.e., a gaming establishment retail wallet) of a gaming establishment retail system integrates with various retail point-of-sale systems throughout the gaming establishment to enable users to purchase goods and/or services via the user's gaming establishment retail account. Continuing with this example, as seen in FIG. 1, the resort wallet 102 further includes or is otherwise in communication with a Retail Wallet 110 (i.e., a gaming establishment retail account maintained by a gaming establishment retail system) accessible via a point-of-sale terminal 112 associated with a gaming establishment.

It should be appreciated that in various embodiments, a gaming establishment retail account is a retail account with a balance or a pre-paid access account which, per current regulations from the U.S. Treasury Department Financial Crimes Enforcement Network ("FinCEN"), cannot be convertible to cash and can only be used for the purchase of goods and/or services. Such a gaming establishment retail account (i.e., a gaming establishment retail wallet) of a gaming establishment retail system integrates with various retail point-of-sale systems of various retail establishments throughout or otherwise associated with a gaming establishment to enable users to purchase ticket vouchers, goods and/or services via the user's gaming establishment retail account. That is, while an amount of funds deposited in a gaming establishment retail account may be used with various retail point-of-sale systems throughout the gaming establishment to enable users to purchase goods and/or services, such funds deposited in the gaming establishment retail account cannot be converted to cash.

In various embodiments, in addition to or an alternative of maintaining one or more gaming establishment retail accounts via one or more gaming establishment retail systems, the gaming establishment fund management system is in communication with a ticket voucher system 114. The ticket voucher system includes one or more servers which store, in one or more databases, ticket voucher identification information associated with each ticket voucher created by the ticket voucher system, such as identifying information, value information, and/or activity information. In addition to maintaining information associated with each ticket voucher, the ticket voucher system includes one or more voucher system components associated with the gaming establishment retail system, such as a ticket voucher printer 116 configured to print purchased paper ticket vouchers as well as a ticket voucher validator 118 (which may be part of or separate from the point-of-sale terminal 112) configured to validate ticket vouchers for redemption. In the illustrated example, the voucher printer and the voucher validator are both associated with the retail establishment to enable the retail establishment to conduct business using ticket vouchers as a form of payment for goods and/or services.

In certain embodiments, the gaming establishment fund management system is in communication with one or more external funding sources which maintain one or more external accounts for the user, such as, but not limited to, one or more credit card accounts maintained by one or more financial institutions, one or more debit card accounts maintained by one or more banks or credit unions, one or more financial institution accounts, such as a brokerage account, maintained by one or more financial institutions and/or one or more third-party maintained accounts (e.g., one or more PayPal® accounts or Venmo® accounts). For example, as seen in FIG. 1, the resort wallet 102 (i.e., the gaming establishment fund management account) is in communication with a network of one or more banks or other financial institutions (i.e., the banking networks 120) which, as described below, operate to electronically transfer funds from the user's accounts maintained as such banks or financial institutions to the gaming establishment fund management system. In certain embodiments, such a network of one or more banks or other financial institutions includes or is in communication with a payment processor 122 which processes the movement of funds between one or more banking accounts which back the amount of funds associated with one or more ticket vouchers and one or more banking accounts associated with a retail establishment that accepts ticket vouchers as a form of payment for goods and/or services.

It should be appreciated that while illustrated as the gaming establishment fund management system being in communication with one or more external funding sources and ticket voucher systems, in different embodiments, any component or sub-system described herein can be in communication with one or more external funding sources and/or ticket voucher systems. For example, the gaming establishment retail system which maintains one or more gaming establishment retail accounts in association with a user may be in communication with a ticket voucher system. It should be further appreciated that in different embodiments, the system utilizes a mobile device running a mobile device application, a kiosk, an EGM, a remote host controller service window displayed by an EGM and/or a gaming establishment interface, such as a casino desk, to facilitate the transfer of funds between one or more gaming establishment accounts and a third-party account, between one or more gaming establishment accounts and a ticket voucher system and/or between different gaming establishment accounts disclosed herein.

In certain embodiments (not shown), the gaming establishment fund management system (which maintains a gaming establishment fund management account or resort wallet for a user) is in communication with one or more credit systems that each issue the user one or more lines of credit or markers and/or one or more credit reporting/credit risk systems that monitor and report on various accounts associated with the user. It should be appreciated that while described as the gaming establishment fund management system being in communication with one or more credit systems and/or one or more credit reporting/credit risk systems, in different embodiments, any component or sub-system described herein can be in communication with one or more credit systems and/or one or more credit reporting/ credit risk systems.

Retail Transactions Utilizing Ticket Vouchers

In various embodiments, prior to utilizing any ticket vouchers to purchase any goods and/or services from a retail establishment, an amount of funds must be converted to one or more ticket vouchers.

In certain embodiments, the system enables an amount of funds deposited in an EGM to be converted to one or more ticket vouchers. In one such embodiment, the system enables a user that has an amount of cash (or other forms of payment as disclosed herein) to utilize an EGM to convert the cash to one or more ticket vouchers via the user first depositing the amount of cash into the EGM and then subsequently cashing out (either pre or post any gaming activity) an amount of a credit balance of the EGM in exchange for a ticket voucher. In another such embodiment, the system enables a user that has one or more printed ticket vouchers to utilize an EGM to convert the printed ticket voucher(s) to a virtual ticket voucher associated with a gaming establishment account maintained for the user. In another such embodiment, the system enables a user that has one or more printed ticket vouchers to utilize an EGM to convert the printed ticket voucher(s) to an anonymous virtual ticket voucher associated with a mobile device In certain embodiments, the system enables an amount of funds deposited in a kiosk to be converted to one or more ticket vouchers. In one such embodiment, the system enables a user that has an amount of cash (or other forms of payment as disclosed herein) to utilize a kiosk to convert the cash to one or more ticket vouchers via the user depositing the amount of cash into the kiosk and then subsequently cashing out the deposited amount in exchange for a ticket voucher. In another such embodiment, the system enables a user that has one or more printed ticket vouchers to utilize a kiosk to convert the printed ticket voucher(s) to a virtual ticket voucher associated with a gaming establishment account maintained for the user. In another such embodiment, the system enables a user that has one or more printed ticket vouchers to utilize a kiosk to convert the printed ticket voucher(s) to an anonymous virtual ticket voucher associated with a mobile device.

In certain embodiments, the system enables an amount of funds provided to a gaming establishment interface, such as a casino desk or cage, to be converted to one or more ticket vouchers. In one such embodiment, the system enables a user that has an amount of cash (or other forms of payment as disclosed herein) to utilize a gaming establishment interface to convert the cash to one or more ticket vouchers via the user providing the amount of cash to the gaming establishment interface in exchange for a ticket voucher. In another such embodiment, the system enables a user that has one or more printed ticket vouchers to utilize a gaming establishment interface to convert the printed ticket voucher (s) to a virtual ticket voucher associated with a gaming establishment account maintained for the user. In another such embodiment, the system enables a user that has one or more printed ticket vouchers to utilize a gaming establishment interface to convert the printed ticket voucher(s) to an anonymous virtual ticket voucher associated with a mobile device.

In certain embodiments, the system enables an amount of funds provided to a retail interface, such as a kiosk or cashier at a retail establishment, to be converted to one or more ticket vouchers. In one such embodiment, the system enables a user that has an amount of cash (or other forms of payment as disclosed herein) to utilize a retail interface to convert the cash to one or more ticket vouchers via the user providing the amount of cash to the retail interface in exchange for a ticket voucher. It should be appreciated that in certain embodiments, the user converts an amount of cash (or other forms of payment) utilizing the retail interface as part of an attempted retail transaction and in other embodiments, the user converts an amount of cash (or other forms of payment) utilizing the retail interface independent of an attempted retail transaction.

In certain embodiments, the system enables an amount of funds associated with a gaming establishment account maintained for the user, such as a gaming establishment retail account or a cashless wagering account, to purchase a ticket voucher (either prior to or in association with a retail purchase of goods and/or services). In these embodiments, the system enables a user to transfer an amount of funds from a gaming establishment account maintained for the user to a ticket voucher system in exchange for a ticket voucher.

It should be appreciated that the system of this embodiment enables funds to move from different accounts within the different systems associated with a gaming establishment to one or more ticket vouchers while adhering to various financial regulations associated with such different accounts. Such a configuration thus enables certain gaming establishments and/or retail establishments to maintain a designated classification in accordance with U.S. Treasury Department regulations without modifying the user's ability to purchase goods and/or services from the retail establishment. That is, since certain gaming establishments and/or retail establishments throughout or otherwise associated with a gaming establishment prefer to remain classified as non-money services businesses per current regulations, the use of purchasing ticket vouchers to facilitate the purchasing of goods and/or services enables such gaming establishments and/or retail establishments to bypass being classified as money services businesses while still offering retail consumers the ability to purchase goods and/or services with funds maintained in one or more gaming establishment accounts.

In certain embodiments wherein funds from a gaming establishment account are potentially used to complete a retail transaction via the purchase of a ticket voucher, when a user attempts to purchase one or more ticket vouchers, the system determines whether to authorize the transfer of an amount of funds from the gaming establishment account maintained by the system to the ticket voucher system. If the system determines not to authorize the amount of funds, the system communicates a denial to the user and does not issue any ticket vouchers. For example, the system utilizes a mobile application running on a mobile device to convey to the user that an amount of funds will not be converted to a ticket voucher. On the other hand, if the system determines to authorize the amount of funds, the system updates the gaming establishment account associated with the user (to reflect a reduction of the amount of funds) and communicates an authorization to the ticket voucher system. The ticket voucher system then creates a ticket voucher associated with the transferred amount of funds. As such, upon a ticket voucher creation event that occurs in association with an attempted retail transaction, the system disclosed herein creates a ticket voucher as a form of payment (or partial payment) for the retail transaction.

It should be appreciated that since a created ticket voucher may take multiple forms, the system disclosed herein includes multiple ways to convey such a created ticket voucher to the user. In one embodiment wherein the created ticket voucher takes the form of a paper ticket voucher, the ticket voucher system causes a ticket voucher printer to print the created ticket voucher. In one such embodiment wherein the creation of the paper ticket voucher occurs in association with the purchase of goods and/or services at a retail establishment, a ticket voucher printer at the retail establishment prints the created ticket voucher for the retail transaction. In another embodiment wherein the created ticket voucher takes the form of a virtual ticket voucher, the ticket voucher system communicates data to a device associated with the user, such as a mobile device running an application associated with the ticket voucher system, to transfer the created virtual ticket voucher to the user.

Following the user obtaining one or more ticket vouchers, such as the system issuing a ticket voucher as part of an attempted purchase of goods and/or services, the system enables a user to utilize one or more ticket vouchers to purchase goods and/or services from a retail establishment.

In one embodiment wherein the ticket voucher takes the form of a paper ticket voucher, the user attempts to complete a purchase of goods and/or services from the retail establishment by providing the paper ticket voucher to the retail establishment. In this embodiment, upon receiving the paper ticket voucher, a point-of-sale terminal ("POST") (or a component of a gaming establishment management system and/or a component of a gaming establishment retail system located inside the POST (i.e., a component of the POST)) at the retail establishment scans the paper ticket voucher to obtain identifying information associated with the presented paper ticket voucher. The POST (or a component of a gaming establishment management system and/or a component of a gaming establishment retail system located inside the POST) then operates with the ticket voucher system to determine whether to authorize the purchase of goods and/or services with the paper ticket voucher. That is, the retail establishment operates with the ticket voucher system to determine whether the amount of funds associated with the paper ticket voucher cover the cost of the goods and/or services attempted to be purchased.

If the system determines not to authorize the purchase because the amount of funds associated with the paper ticket voucher are inadequate to pay for the goods and/or services from the retail establishment, the system communicates a denial, such as via a display device of the POST, and does not complete the purchase. In certain embodiments, the system informs the user of the balance of the paper ticket voucher and enables the user to present additional forms of payment, such as another ticket voucher (which the system would need to subsequently authorize the use of) or cash, to supplement the presented paper ticket voucher to potentially complete the attempted retail transaction.

On the other hand, if the system determines to authorize the purchase because the amount of funds associated with the paper ticket voucher are adequate to pay for the goods and/or services, the system notifies the retail establishment, such as via a display device of the POST, of the approved sale and informs the retail establishment to accept the paper ticket voucher in exchange for the goods and/or services. It should be appreciated that since certain jurisdictions impose regulations that require a physical piece of paper with the voucher information printed on it as part of the soft-count process to ensure cash and ticket voucher accounting balances, the retail establishment receiving the paper ticket voucher satisfies such jurisdictional regulations. In these situations, similar to a drop box of an EGM collecting paper ticket vouchers for accounting and taxation purposes, the POST of the retail establishment functions as a drop box for collecting paper ticket vouchers for accounting and taxation purposes.

In one embodiment wherein the ticket voucher takes the form of a virtual ticket voucher, to purchase goods and/or services utilizing a virtual ticket voucher, the user presents a retail wallet identity (i.e., a physical card associated with a gaming establishment account associated with a virtual ticket voucher or a mobile device running a mobile device application associated with a gaming establishment account associated with a virtual ticket voucher or a mobile device running a mobile device application associated with a virtual ticket voucher independent of any gaming establishment account) at an applicable terminal of the point-of-sale system for the purchase of goods and/or services. For example, to make a purchase of goods and/or services, a mobile device application prompts the user to cause the mobile device to engage the POST, such as prompting the user to tap the mobile device to a designated portion of the POST (or otherwise moving the mobile device to within a designated distance of a designated location of the POST). For example, as seen in FIG. 2A, to make a purchase of goods and/or services for $2500 and upon launching the application on the mobile device 210, the mobile device application 220 displays that the user has a $6000 balance in their gaming establishment retail account (i.e., the displayed $6000 Retail Wallet Balance) and instructs the user to tap the mobile device to the register (i.e., the point of sale terminal) to complete the $2500 purchase via the purchase of a virtual ticket voucher for $2500. In this example, as seen in FIG. 2B, as part of the purchase of the goods and/or services for $2500, the system proceeds to purchase, as described herein, a $2500.00 virtual ticket voucher (using part of the $6000.00 in the gaming establishment retail account) that becomes associated with the gaming establishment retail account prior to being transferred to being associated with the retail establishment account. As seen in FIG. 2B, the purchase of the virtual ticket voucher as part of the attempted retail transaction leaves the user with, as seen via the mobile device application 220 of the mobile device 210, a $3500 balance in their gaming establishment retail account (i.e., the displayed $3500 Retail Wallet Balance) and a virtual ticket voucher of $2500. It should be appreciated that while this illustrated example includes displaying to the user the purchase of a virtual ticket voucher to facilitate the attempted retail transaction, in certain embodiments, the system does not inform the user of the purchase of the virtual ticket voucher but rather proceeds with the purchase of a virtual ticket voucher and the subsequent transfer of the virtual ticket voucher to the retail establishment as part of the retail transaction without the user being informed of such steps.

In certain embodiments wherein the retail wallet identity utilizes a mobile device application associated with a gaming establishment account associated with a virtual ticket voucher, the mobile device application utilized is a location based digital wallet enabled application, such as a Passbook-enabled or Wallet-enabled application, which is accessible when the user enters a gaming establishment and/or the retail establishment. In certain embodiments, the mobile device application utilized is downloaded to the mobile device from an application store. In certain embodiments, the mobile device application utilized is downloaded to the mobile device from one or more websites affiliated with the gaming establishment and/or the retail establishment (which are accessible directly by the user and/or by a link opened when the user scans a QR code associated with the POST).

In certain embodiments wherein the retail wallet identity utilizes a mobile device application associated with a gaming establishment account associated with a virtual ticket voucher, after a user has opened an application on a mobile device and selected an action to be performed (such as a selection of an icon displayed by an application of the mobile device which represents a virtual ticket voucher to be redeemed for the purchase of goods and/or services and/or a selection to of an icon displayed by an application of the mobile device which represents to purchase an amount of goods and/or services (with or without the user knowing that the purchase is completed via the initial purchase of a ticket voucher and the subsequent exchange of the purchased ticket voucher for the goods and/or services), the system determines if the mobile device application is associated with an active authorization token previously created by the system. In these embodiments, an authorization token is a time-based token which expires after a designated period of time and which is associated with an additional level of user authentication beyond a user's application username and application password.

If the system determines that the application is not associated with an active authorization token previously created by the system, the mobile device application prompts the user to provide identifying information, such as a personal identification number or biometric identifier. The mobile device application stores the provided identifying information as mobile device encrypted data. Following the user providing identifying information, the mobile device application prompts the user to cause the mobile device to engage the POST (or a component of the POST), such as prompting the user to tap the mobile device to a designated portion of the POST. It should be appreciated that any reference herein to a user tapping the mobile device to a designated portion of the POST (or a component of the POST) may or may not include the user pressing a fingerprint scanner (if the mobile device is equipped with such a fingerprint scanner) while concurrently engaging the POST (or a component of the POST). In other embodiments, the mobile device application verifies the identifying information of the user by communicating with a verification/authentication server over one or more wireless communication protocols, such as WiFi protocol, a cellular communication protocol (e.g., 3G or LTE), to obtain the active authorization token.

In certain embodiments, following the user causing the mobile device to engage the POST (e.g., the user taps the mobile device to designated location(s) of the POST), the mobile device application communicates, via a wireless communication protocol, the provided identifying information and the requested action to be performed to the POST (or to a component associated with the POST). For example, upon the user tapping the mobile device to a designated location of the POST (or otherwise moving the mobile device to within a designated distance of the designated locations of the POST), the mobile device application sends the identifying information and the requested action to a component of a gaming establishment management system and/or a component of a gaming establishment retail system located inside the POST (i.e., a component of the POST).

Following the communication of the identifying information and the requested action to the POST (or a component associated with the POST), the system determines if the identifying information is valid. For example, a designated system component configured to operate with the gaming establishment retail system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the user to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the user to press the fingerprint scanner while engaging the POST, such as tapping the mobile device to a designated portion of the POST.

On the other hand, if the system determines that the identifying information is valid, the system creates an authorization token. The system associates the authorization token with a timestamp of when the authorization token will expire. In certain embodiments, a system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

Following the creation of an authorization token, the system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the POST (i.e., a component of the POST), communicates the created authorization token to the mobile device and proceeds with executing or otherwise initiating the execution of the requested action.

On the other hand, following a determination that the mobile device application is associated with a previously created and stored authentication token, the mobile device application prompts the user to cause the mobile device to engage the POST, such as prompting the user to tap the mobile device to a designated portion of the POST.

Following the user causing the mobile device to engage the POST (e.g., the user taps the mobile device to a designated location of the POST), the mobile device application communicates, via a wireless communication protocol, the previously stored authorization token and the requested action to be performed to the POST (or to a component associated with the POST). For example, upon the user tapping the mobile device to a user tracking card reader or other designated location(s) of the POST, the mobile device application sends the stored authorization token and the requested action to a component of a gaming establishment management system and/or a component of a gaming establishment retail system located inside the POST (i.e., a component of the POST).

Following the communication of the stored authorization token and the requested action to the POST or a component associated with the POST, the system determines if the communicated authorization token is still valid. For example, a system component configured to operate with a gaming establishment retail system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the user to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the component of a gaming establishment management system located inside the POST proceeds with executing the requested action and communicates a requested action response to the mobile device.

In certain embodiments, following the presentation of the retail wallet identity to the POST, following the procurement of a virtual ticket voucher in association with the attempted retail transaction and upon receiving data or information regarding the retail wallet identity and identifying information associated with a virtual ticket voucher, the POST (or a component of a gaming establishment management system and/or a component of a gaming establishment retail system located inside the POST (i.e., a component of the POST)) operates with the ticket voucher system to determine whether to authorize the purchase of goods and/or services with a virtual ticket voucher. That is, the retail establishment operates with the ticket voucher system to determine whether the amount of funds associated with the virtual ticket voucher cover the cost of the goods and/or services attempted to be purchased. It should be appreciated that while the system procures a virtual ticket voucher in association with certain retail transactions (wherein the procured virtual ticket voucher should be associated with an amount of funds to cover the cost of the goods and/or services attempted to be purchased), in certain situations wherein the user attempts to utilize a previously obtained virtual ticket voucher for a retail transaction, the previously obtained virtual ticket voucher may or may not be associated with an amount of funds to cover the cost of the goods and/or services attempted to be purchased.

If the system determines not to authorize the purchase because the amount of funds associated with the virtual ticket voucher are inadequate to pay for the goods and/or services from the retail establishment, the system communicates a denial, such as via a display device of the POST and/or the application running on the mobile device, and does not complete the purchase. In certain embodiments, the system informs the user of the balance of the virtual ticket voucher and enables the user to present additional forms of payment, such as another virtual ticket voucher (which the system would need to subsequently authorize the use of) or cash, to supplement the presented virtual ticket voucher to potentially complete the attempted retail transaction.

On the other hand, if the system determines to authorize the purchase because the amount of funds associated with the virtual ticket voucher are adequate to pay for the goods and/or services, in certain embodiments, the system notifies the retail establishment, such as via a display device of the POST, of the approved sale and proceeds to transfer the virtual ticket voucher from being associated with the user to being associated with the retail establishment. For example, as seen in FIG. 2C, in association with the purchase of the goods and/or services for $2500, the system transfers the purchased $2500 virtual ticket voucher from being associated with the gaming establishment retail account maintained for the user to the account maintained for the retail establishment (resulting in the $2500 virtual ticket voucher no longer being displayed by the mobile device application) leaving the user with, as seen via the mobile device application 220 of the mobile device 210, a $3500 balance in their gaming establishment retail account (i.e., the displayed $3500 Retail Wallet Balance). Following the transfer the virtual ticket voucher from being associated with the user to being associated with the retail establishment (and a confirmation of transfer being displayed, such as via a display device of the POST, to the retail establishment to provide the purchased goods and/or services to the user), the system deems the purchase as complete. In other embodiments, if the system determines to authorize the purchase because the amount of funds associated with the virtual ticket voucher are adequate to pay for the goods and/or services, in certain embodiments, the system notifies the retail establishment, such as via a display device of the POST, of the approved sale and the retail establishment proceeds to redeem the ticket voucher for an amount of funds (rather than hold the ticket voucher and run the risk that the user, who may know the validation identifier of the ticket voucher, attempts to use that ticket voucher at another location).

In certain embodiments, the transfer of a virtual ticket voucher occurs via the mobile device of the user communicating data or information to the ticket voucher system regarding the virtual ticket voucher to be transferred. In these embodiments, for each virtual ticket voucher to be transferred, the mobile device application of the mobile device of the user communicates to the ticket voucher system the virtual ticket voucher identification information. In these embodiments, the mobile device application of the mobile device communicates the virtual ticket voucher identifying information to the ticket voucher system over one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

In various embodiments, following the ticket voucher system receiving the virtual ticket voucher identification information for the attempted retail transaction, to reflect this transfer of one or more virtual tickets, the ticket voucher system updates a listing or log of which virtual ticket vouchers are associated with the user and which virtual ticket vouchers are associated with the retail establishment. That is, the ticket voucher system deletes the data associated with the transferred virtual ticket voucher from being associated with the gaming establishment account of the user (such that, short of the same virtual ticket voucher being transferred back to the mobile device of the user, that mobile device cannot be subsequently used in association with that virtual ticket voucher again) and adds the data associated with the transferred virtual ticket voucher as being associated with the retail account of the retail establishment that sold the goods and/or services.

In another embodiment, rather than the user purchasing a ticket voucher of an amount associated with an attempted retail transaction, the retail establishment purchases a ticket voucher of an amount associated with an attempted retail transaction. In these embodiments, upon the user presenting an amount of funds (in any form described herein) to the retail establishment to purchase goods and/or services, the POST (or a component of a gaming establishment management system and/or a component of a gaming establishment retail system located inside the POST) interfaces with the ticket voucher system to procure a ticket voucher, in paper or virtual form, associated with the amount of funds.

In certain embodiments, the system enables a user to pay for goods and/or services at a retailer using a ticket voucher as the sole instrument to fund the retail transaction. In certain other embodiments, the system enables a user to pay for goods and/or services at a retailer using a ticket voucher as well as a pre-paid card. In these embodiments, since certain regulations impose spending limits on an individual pre-paid card and since the funds on such pre-paid cards may not be converted to cash, the system disclosed herein determines, based on the amount of the attempted retail transaction and the spending limit per individual pre-paid card, whether or not to employ a ticket voucher to complete an attempted retail transaction. For example, if regulations impose a $2000 daily spending limit on each individual pre-paid card and a user wishes to complete a retail purchase of goods and/or services valued at $2500, the system determines that the user will need to utilize a pre-paid card having a balance of at least $2000 and a ticket voucher having a balance of $500 to complete the purchase of the goods and/or services valued at $2500.

Figure 3:
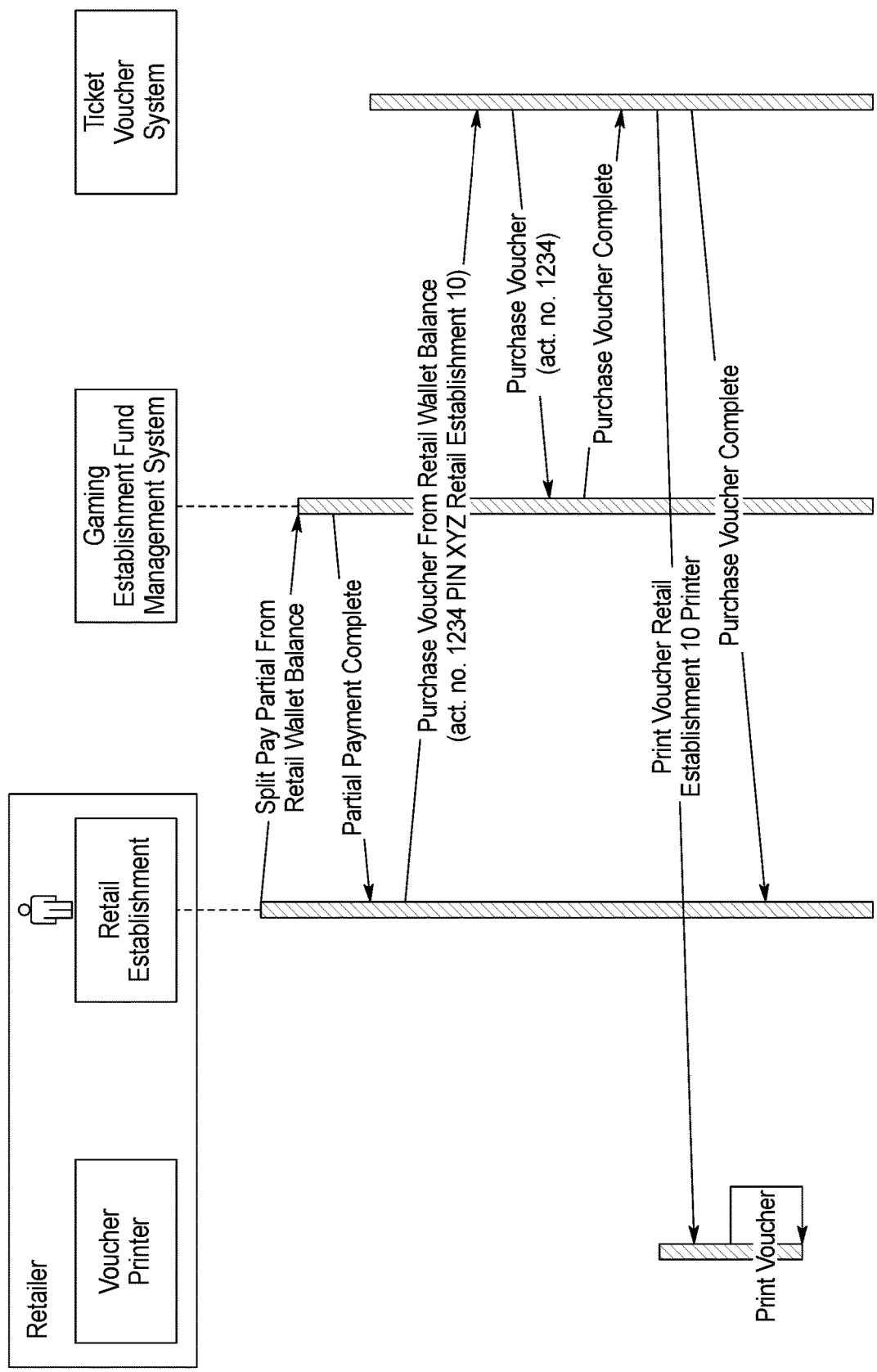
FIG. 3 is a schematic diagram of the interactions between a retail system, a gaming establishment fund management system and a ticket voucher system in association with producing a ticket voucher in association with a retail purchase.

In such embodiments wherein the system determines that the funding of an attempted retail transaction will come from both a pre-paid card and a ticket voucher, the system operates with a gaming establishment fund management system (which maintains an amount of funds to purchase at least the ticket voucher), as well as the ticket voucher system (which issues such ticket vouchers) to complete such a retail transaction. For example, as seen in FIG. 3, following a determination that spending limit on a pre-paid card will cover less than the full cost of the goods and/or services attempted to be purchased, through a series of messages and actions between the retail system, such as a POST, the gaming establishment fund management system, and the ticket voucher system, the system disclosed herein procures a ticket voucher (in the amount which the costs of the goods and/or services exceeds the spending limit on the pre-paid card) to complete the retail transaction.

In certain embodiments, following the completion of the retail transaction utilizing a ticket voucher, the retail establishment (whom is now in possession of one or more paper ticket vouchers and/or associated with one or more virtual ticket vouchers) needs to redeem such ticket vouchers for an amount of currency. In one such embodiment wherein the ticket vouchers are in paper form, the retail establishment can redeem such paper ticket vouchers for cash at a gaming establishment kiosk and/or at a gaming establishment interface, such as a casino desk. In another such embodiment wherein the ticket vouchers are in paper form, the retail establishment can redeem such paper ticket vouchers for an amount of credits of an EGM.

Figure 4:
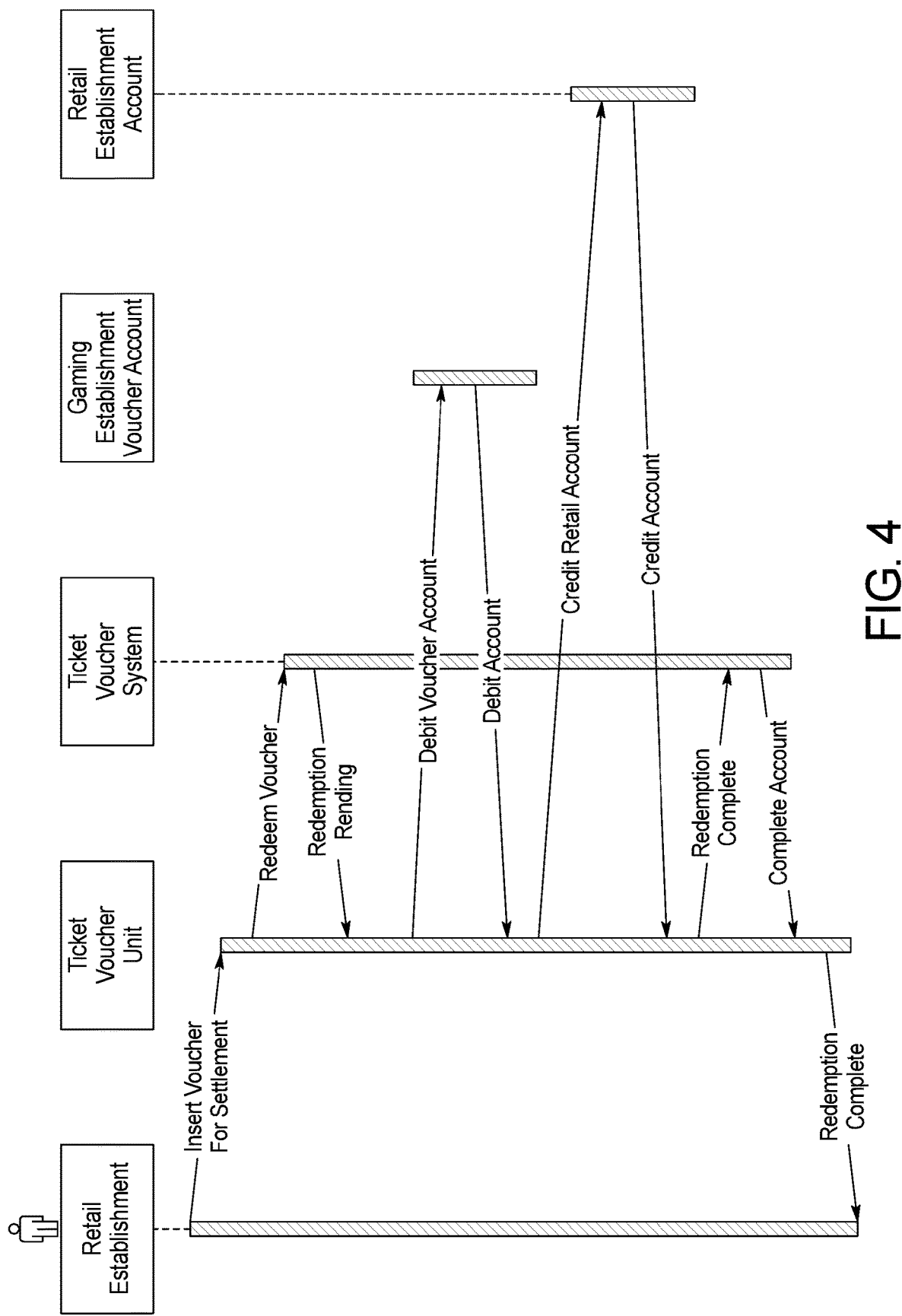
FIG. 4 is a schematic diagram of the interactions between a retail system, a gaming establishment fund management system and a ticket voucher system in association with redeeming a ticket voucher utilized in association with a retail purchase.

In another such embodiment wherein the ticket vouchers are in paper form, utilizing a voucher validation unit, the retail establishment can scan the ticket voucher, wherein the ticket voucher validation unit communicates with the ticket voucher system to redeem the ticket voucher. In another such embodiment wherein the ticket vouchers are in electronic form, utilizing a voucher validation unit, the retail establishment can select which virtual ticket vouchers associated with the retail to redeem, wherein the ticket voucher validation unit communicates with the ticket voucher system to redeem the ticket voucher. In these embodiments, as seen in FIG. 4, through a series of messages and actions between the ticket voucher validation unit, the ticket voucher system and various banking systems which maintain various banking accounts associated with the ticket voucher system and the retail establishment, the system disclosed herein enables the retail establishment to settle the retail transaction which utilized a ticket voucher. That is, since the virtual ticket vouchers are bearer instruments, the retail establishment can subsequently redeem one or more ticket vouchers by initiating a fund transfer wherein an amount of funds corresponding to the amount of the redeemed ticket vouchers are transferred from a gaming establishment account which backs the ticket voucher system, such as a banking account associated with the gaming establishment to a retail establishment account, such as a banking account associated with the retail establishment and the ticket voucher system reduces the amount of funds associated with the ticket voucher identifier of the redeemed ticket vouchers to account for the fund transfer.

Accordingly, the system disclosed herein utilizes ticket vouchers to complete retail purchases to reduce the amount of cash which a user may carry to be used for purchasing goods and/or services. This reduction in the amount of cash users have to carry on their person diminishes the risks that such cash may be lost or stolen (which is associated with various costs to the player and the gaming establishment) prior to the retail purchase. As such, the utilization of ticket vouchers to complete one or more retail transactions (and without utilizing any physical forms of currency) expands the cashless eco-system certain gaming system strive for and thus overcomes various security concerns and labor cost concerns associated with cash-based retail transactions.

Funding Gaming Establishment Account

In various embodiments, the system enables an amount of funds associated with a gaming establishment account maintained for the user, such as a gaming establishment retail account or a cashless wagering account, to purchase a ticket voucher to complete a retail purchase of goods and/or services. In these embodiments, prior to using the funds in a gaming establishment retail account to purchase a ticket voucher, an amount of funds must first be established or otherwise deposited in the gaming establishment retail account. It should be appreciated that while described herein in relation to funding a gaming establishment retail account, the disclosed funding methods are applicable for the other gaming establishment accounts described herein.

In certain embodiments, to fund a gaming establishment retail account, the system enables a user to enroll or otherwise sign up for a gaming establishment retail account via a user picking up a retail account card at various locations, such as shops, throughout the gaming establishment. In certain embodiments, the system enables a user to electronically enroll or otherwise sign up for a gaming establishment retail account via a mobile application running on a mobile device, a point-of-sale terminal, an EGM and/or a kiosk. In certain embodiments, the system enables a user to enroll or otherwise sign up for a gaming establishment retail account by adding a retail account to their existing player tracking account.

In certain embodiments, the creation of a gaming establishment retail account occurs enterprise wide upon a user (whom is not associated with a gaming establishment retail account) attempting to use an amount of funds associated with the user (i.e., funds associated with the user's resort wallet or enterprise wallet) at a first site. In these embodiments, upon the requested use of the funds of the user's resort wallet from a component of the system not otherwise linked to or associated with the user's resort wallet, the system will create an enterprise wide gaming establishment retail account associated with the requesting component of the system and one or more other components of the system (such as one or more other individual sites of future attempted purchases). In certain embodiments, the creation of a gaming establishment retail account occurs via the user attempting to use an amount of funds associated with the user (i.e., funds associated with the user's resort wallet or enterprise wallet) at an individual site which was not previously associated with the user's resort wallet or enterprise wallet. In these embodiments, upon the requested use of the funds of the user's resort wallet from a component of the system not otherwise linked to or associated with the user's resort wallet, the system will create a gaming establishment retail account associated with the requesting component of the system. For example, if a user attempts to use funds from their resort wallet at a gaming establishment retail location not previously linked to the user's resort wallet, prior to the system employing such funds to purchase one or more pre-paid cards to complete the retail transaction, the system will create a gaming establishment retail account for the gaming establishment retail location and associate the created gaming establishment retail account with the user's existing resort wallet. Such dynamic account creation provides users enhanced ease of use as they can seamlessly use their existing resort wallet at various new sites or locations within or otherwise associated with one or more gaming establishments.

In certain embodiments, a gaming establishment retail account is associated with a third-party account, such as one or more credit card accounts, one or more debit card accounts and/or one or more third-party maintained accounts (e.g., one or more PayPal® accounts or Venmo® accounts), from which funds are drawn from to fund the gaming establishment retail account. In certain embodiments, the gaming establishment retail account is associated with a gaming establishment or a group of gaming establishments, wherein the system enables the user to establish a gaming establishment retail account by a deposit of funds (such as at a kiosk). In other embodiments, the system funds the gaming establishment retail account via a mobile device electronic fund transfer, such using Apple Pay™ or Android Pay™. In various embodiments, the system utilizes a mobile device running a mobile device application, a kiosk, an EGM and/or a gaming establishment interface to facilitate this transfer of funds from a third-party account.

In certain embodiments, the system enables funds to be deposited in a gaming establishment retail account via drawing funds from a gaming establishment credit system which issues the user a line of credit or marker. In certain other embodiments, the system includes one or more gaming establishment fund management systems which are each associated with or otherwise maintain one or more gaming establishment fund management accounts for a user. In these embodiments, the gaming establishment fund management system (which maintains a gaming establishment fund management account for a user) is in communication with one or more credit systems which each issue the user one or more lines of credit or markers, wherein prior to the funds drawn from the line of credit being transferred to a gaming establishment retail account, such funds must first be transferred to or otherwise established in the gaming establishment fund management account via one or more lines of credits. In various embodiments, the system utilizes a mobile device running a mobile device application, a kiosk, an EGM and/or a gaming establishment interface to facilitate these transfer(s) of funds from the gaming establishment credit system.

In certain embodiments, the system enables funds to be deposited in a gaming establishment retail account via an EGM. In certain embodiments, the system enables a user that has an amount of cash to utilize an EGM to convert the cash to an amount deposited into a gaming establishment retail account (which is subsequently utilized to purchase ticket vouchers, goods and/or services at a retail establishment, such as a retail establishment associated with a gaming establishment). In other embodiments, the system enables funds to be deposited in a gaming establishment retail account via an EGM that accepts printed ticket vouchers. In these embodiments, the system enables a user that has one or more printed ticket vouchers to utilize an EGM to convert the printed ticket voucher to an amount deposited into a gaming establishment retail account (which is subsequently utilized to purchase ticket vouchers, goods and/or services at a retail establishment, such as a retail establishment associated with a gaming establishment).

In certain embodiments, the system enables funds to be deposited in a gaming establishment retail account via a gaming establishment interface, such as at a casino desk. In certain embodiments, the system enables a user that has an amount of cash to utilize a gaming establishment interface, such as at a casino desk to convert the cash to an amount deposited into a gaming establishment retail account (which is subsequently utilized to purchase ticket vouchers, goods and/or services at a retail establishment, such as a retail establishment associated with a gaming establishment). In other embodiments, the system enables funds to be deposited in a gaming establishment retail account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment retail account (which is subsequently utilized to purchase ticket vouchers, goods and/or services at a retail establishment, such as a retail establishment associated with a gaming establishment).

In certain embodiments, the system enables funds to be deposited in a gaming establishment retail account via a kiosk that accepts money. In certain embodiments, the system enables a user that has an amount of cash to utilize a kiosk to convert the cash to an amount deposited into a gaming establishment retail account (which is subsequently utilized to purchase ticket vouchers, goods and/or services at a retail establishment, such as a retail establishment associated with a gaming establishment). In other embodiments, the system enables funds to be deposited in a gaming establishment retail account via a kiosk that accepts printed ticket vouchers. In these embodiments, the system enables a user that has one or more printed ticket vouchers to utilize a kiosk to convert the printed ticket voucher to an amount deposited into a gaming establishment retail account (which is subsequently utilized to purchase ticket vouchers, goods and/or services at a retail establishment, such as a retail establishment associated with a gaming establishment).

In certain embodiments, the system enables a user to fund the gaming establishment retail account independent of the mobile device and independent of the mobile device application. In certain other embodiments, the system enables a user to utilize a mobile device running a mobile device application to fund the gaming establishment retail account. More specifically and utilizing the example of a kiosk, in one embodiment, to utilize a mobile device and a kiosk to facilitate the funding of a gaming establishment retail account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with an EGM as described herein.

After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a physical ticket voucher (associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the user to transfer the deposited amount of funds (e.g., a "Load Phone Now" button) or continue to deposit additional amounts of funds with the kiosk. In certain embodiments, upon receiving an amount of funds from the user and the user indicating to transfer the deposited amount of funds in association with the mobile device application, the kiosk communicates with one or more servers, such as a gaming establishment retail server, to transfer an amount of money to a gaming establishment retail account (to be subsequently utilized to purchase ticket vouchers, goods and/or services at a retail establishment, such as a retail establishment associated with a gaming establishment).

It should be appreciated that while the above example embodiments are described in relation to utilizing a mobile device to facilitate the transferring one or more amounts of money or units of currency from a kiosk to a gaming establishment retail account, such example embodiments may also be used to transfer, either as an isolated transaction or as part of an operation mode of the EGM, one or more amounts of money or units of currency from an EGM to a gaming establishment retail account and/or from a gaming establishment interface, such as a casino desk, to a gaming establishment retail account.

It should be further appreciated that the employing of one or more ticket vouchers to complete a retail transaction utilizes one or more components of the gaming establishment fund management system, the ticket voucher system and/or the gaming establishment retail system. Such components of the gaming establishment fund management system, the ticket voucher system, and/or gaming establishment retail system include one or more servers (which maintain one or more gaming establishment accounts for the user and facilitate the transfer of funds from such gaming establishment accounts to one or more ticket vouchers), and/or one or more ticket voucher creators (which facilitate the generation of one or more ticket vouchers for redemption at one or more POSTs to complete one or more purchases of goods and/or services). In these embodiments, such components of the gaming establishment fund management system, ticket voucher system, and/or the gaming establishment retail system each include a controller including at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, ticket voucher system, and/or gaming establishment retail system; (3) accessing memory to configure or reconfigure parameters in the memory according to indicia read from the component of the gaming establishment fund management system, ticket voucher system, and/or gaming establishment retail system; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, ticket voucher system, and/or gaming establishment retail system, while in other embodiments, at least one component of the controller resides outside of the housing of the component of the gaming establishment fund management system, ticket voucher system, and/or gaming establishment retail system.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, ticket voucher system, and/or gaming establishment retail system disclosed herein. In certain embodiments, the at least one memory device resides within the housing of the component of the gaming establishment fund management system, ticket voucher system, and/or gaming establishment retail system, while in other embodiments at least one component of the at least one memory device resides outside of the housing of the component of the gaming establishment fund management system, ticket voucher system, and/or gaming establishment retail system. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, ticket voucher system, and/or gaming establishment retail system; (2) associations between configuration indicia read from a component of the gaming establishment fund management system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, ticket voucher system, and/or gaming establishment retail system to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, ticket voucher system, and/or gaming establishment retail system to control the component of the gaming establishment fund management system, ticket voucher system, and/or gaming establishment retail system. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the gaming establishment fund management system to implement at least part of the present disclosure. In other embodiments, part or all of the program code and/or the operating data is downloaded to the at least one memory device of the component of the gaming establishment fund management system, ticket voucher system, and/or gaming establishment retail system through any suitable data network described above (such as an Internet or intranet).

The at least one memory device also stores a plurality of device drivers. Examples of different types of device drivers include device drivers for component of the gaming establishment fund management system components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, ticket voucher system, and/or gaming establishment retail system. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, ticket voucher system, and/or gaming establishment retail system loads the new device driver from the at least one memory device to enable communication with the new device. For instance, one type of card reader in the component of the gaming establishment fund management system, ticket voucher system, and/or gaming establishment retail system can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified component of the gaming establishment fund management system components and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

Mobile Device Communications

As indicated above, in various embodiments, one or more actions occur between a mobile device and one or more components of the gaming establishment fund management system, the ticket voucher system, and/or the gaming establishment retail system, via one or more wireless communication protocols between the mobile device and the component of the gaming establishment fund management system, the ticket voucher system, and/or the gaming establishment retail system.

In certain embodiments, the communication with the mobile device can occur through one or more wireless interfaces of the component of the gaming establishment fund management system, the ticket voucher system, and/or the gaming establishment retail system. In one embodiment, the wireless interface is integrated into the cabinet of the component of the gaming establishment fund management system, the ticket voucher system, and/or the gaming establishment retail system and the processor of the component of the gaming establishment fund management system, the ticket voucher system, and/or the gaming establishment retail system is configured to communicate directly with and send control commands to the wireless interface. In another embodiment, the wireless interface is integrated into a device mounted to and/or within the cabinet of the component of the gaming establishment fund management system, the ticket voucher system, and/or the gaming establishment retail system. In certain embodiments where the wireless interface is embedded in a secondary device, the processor of the component of the gaming establishment fund management system, the ticket voucher system, and/or the gaming establishment retail system sends control commands to control the wireless interface via a secondary controller.

In certain embodiments which utilize a near field communication (NFC) implementation, the mobile device application registers a mobile device application with one or more processors of the mobile device. In these embodiments, when the mobile device is detected by an NFC reader of a component of the gaming establishment fund management system, the ticket voucher system, and/or the gaming establishment retail system, the component of the gaming establishment fund management system, the ticket voucher system, and/or the gaming establishment retail system communicates one or more data messages to the mobile device (or to one or more servers which then communicate such data messages to the mobile device). Such data messages are commands generated by the component of the gaming establishment fund management system, the ticket voucher system, and/or the gaming establishment retail system when the mobile device is detected in the NFC reader field. The processor of the mobile device communicates the data message to the mobile device application. The mobile device application responds, such as communicating a triggering message, and a communication channel is opened between the component of the gaming establishment fund management system, the ticket voucher system, and/or the gaming establishment retail system and the mobile device application (or between the component of the gaming establishment fund management system, the ticket voucher system, and/or the gaming establishment retail system, one or more servers and the mobile device application). This open communication channel enables the component of the gaming establishment fund management system, the ticket voucher system, and/or the gaming establishment retail system to send, though the NFC reader, additional data messages to the mobile device (or to the mobile device via one or more servers) which are responded to by the mobile device application of the mobile device. It should be appreciated that as long as the mobile device remains within the NFC field, the component of the gaming establishment fund management system, the ticket voucher system, and/or the gaming establishment retail system is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the communication of data between the mobile device and the component of the gaming establishment fund management system, the ticket voucher system, and/or the gaming establishment retail system. In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the component of the gaming establishment fund management system, the ticket voucher system, and/or the gaming establishment retail system, zero, one or more servers and a mobile device, such as secure pairing using one of these protocols. That is, in one embodiment, an NFC interface on a component of the gaming establishment fund management system, the ticket voucher system, and/or the gaming establishment retail system can be used to set-up a higher speed communication between the component of the gaming establishment fund management system, the ticket voucher system, and/or the gaming establishment retail system, zero, one or more servers and the NFC enabled mobile device. The higher speed communication rates can be used for expanded content sharing. For instance, a NFC and Bluetooth enabled component of the gaming establishment fund management system, the ticket voucher system, and/or the gaming establishment retail system can be tapped by an NFC and Bluetooth enabled mobile device for instant Bluetooth pairing between the devices and zero, one or more servers. Instant Bluetooth pairing between a component of the gaming establishment fund management system, the ticket voucher system, and/or the gaming establishment retail system, an NFC enabled mobile device and zero, one or more servers, can save searching, waiting, and entering codes. In another example, a component of the gaming establishment fund management system, the ticket voucher system, and/or the gaming establishment retail system can be configured as an NFC enabled router, such as a router supporting a Wi-Fi communication standard. Tapping an NFC enabled mobile device to an NFC enabled and Wi-Fi enabled component of the gaming establishment fund management system, the ticket voucher system, and/or the gaming establishment retail system can be used to establish a Wi-Fi connection between the devices and zero, one or more servers.

In certain embodiments which implement a Wi-Fi, cellular and/or Bluetooth™ communications protocol, the system utilizes one or more QR codes generated by the component of the gaming establishment fund management system, the ticket voucher system, and/or the gaming establishment retail system to facilitate the communication of data between the mobile device and the system. In such embodiments, the QR code is used to identify the component of the gaming establishment fund management system, the ticket voucher system, and/or the gaming establishment retail system that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the component of the gaming establishment fund management system, the ticket voucher system, and/or the gaming establishment retail system. In these embodiments, a communication tunnel wrapper (i.e., a Wi-Fi/Bluetooth™ tunnel wrapper) is utilized to establish a connection between the system and the mobile device and to transport any data messages described herein between the component of the gaming establishment fund management system, the ticket voucher system, and/or the gaming establishment retail system, zero, one or more servers and the mobile device.

More specifically, in certain embodiments, the user requests, via an input at the component of the gaming establishment fund management system, the ticket voucher system, and/or the gaming establishment retail system and/or the mobile device, the generation of a QR code by the component of the gaming establishment fund management system, the ticket voucher system, and/or the gaming establishment retail system. In response to the user's request, the component of the gaming establishment fund management system, the ticket voucher system, and/or the gaming establishment retail system displays a QR code. In certain embodiments, the QR code includes a nonce which prevents a third-party (e.g., another user) from sniping the user's login attempt. Such an on-demand QR code remains valid for a designated amount of time such that if the user does not scan the QR code within the designated amount of time, another QR code is necessary to be scanned to connect the mobile device to the component of the gaming establishment fund management system, the ticket voucher system, and/or the gaming establishment retail system.

In these embodiments, the user scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the user via the mobile device application does not require a new engagement between the mobile device and the component of the gaming establishment fund management system, the ticket voucher system, and/or the gaming establishment retail system, such as a new scanning of the QR code to send such a requested action from the mobile device to the component of the gaming establishment fund management system, the ticket voucher system, and/or the gaming establishment retail system (or to send a requested action from the mobile device to one or more servers and then from one or more servers to the component of the gaming establishment fund management system, the ticket voucher system, and/or the gaming establishment retail system).

In certain embodiments, following the scanning of a valid QR code, the mobile device application connects to one or more servers. In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the user and directs the user to rescan the QR code.

In addition to the connect command communicated from the mobile device application to the system, the mobile device application of these embodiments is configured to send a disconnect command to the system. Such a disconnect command functions to tear-down the connection the server. It should be appreciated that if the mobile device connection is severed before this command is received by the system, the sever sends this command on behalf of the mobile device application;

In another embodiment, the mobile device application is configured to send a trigger command to the system, such as a component of the gaming establishment fund management system, the ticket voucher system, and/or the gaming establishment retail system. In this embodiment, the trigger command is associated with an action requested by the user. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the user and enable the user to retry the requested action.

In other embodiments, the mobile device application communicates with the system through a tunnel established over the mobile device's Wi-FI network or the mobile device's network connection. In such embodiments, the mobile device application will connect to one or more system servers which use websockets secured with a transport layer security protocol. The system server operates with one or more translators, similarly using websockets secured with a transport layer security protocol to communicate data to the component of the gaming establishment fund management system, the ticket voucher system, and/or the gaming establishment retail system.

In certain embodiments which utilize the NFC communication protocol described herein, which utilize the Wi-Fi, cellular and/or Bluetooth™ communication protocols described herein and/or which utilize any other communication protocol described herein, any action requested by the user via the mobile device application requires a new engagement between the mobile device and the component of the gaming establishment fund management system, the ticket voucher system, and/or the gaming establishment retail system, such as a new tap of the mobile device to a card reader or other designated location(s) of the component of the gaming establishment fund management system, the ticket voucher system, and/or the gaming establishment retail system. In certain other embodiments which utilize the NFC communication protocol described herein, which utilize the Wi-Fi, cellular and/or Bluetooth™ communication protocols described herein and/or which utilize any other communication protocol described herein, certain actions requested by the user via the mobile device application requires a new engagement between the mobile device and the component of the gaming establishment fund management system, the ticket voucher system, and/or the gaming establishment retail system, such as a new tap of the mobile device to a card reader or other designated location(s) of the component of the gaming establishment fund management system, the ticket voucher system, and/or the gaming establishment retail system and other actions requested by the user via the mobile device application do not require any new engagement between the mobile device and the component of the gaming establishment fund management system, the ticket voucher system, and/or the gaming establishment retail system.

It should be appreciated that while certain data or information pertaining to one or more of the requested actions are communicated between a component of the gaming establishment fund management system, the ticket voucher system, and/or the gaming establishment retail system and a mobile device, such data or information may additionally or alternatively be communicated: (i) between one or more servers and a mobile device via one or more wireless communication protocols, or (ii) between a component of the gaming establishment fund management system, the ticket voucher system, and/or the gaming establishment retail system and one or more servers via one or more wireless communication protocols and then from one or more servers to a mobile device via one or more wireless communication protocols.

It should additionally be appreciated that any functionality or process described herein may be implemented via one or more servers, a component of the gaming establishment fund management system, the ticket voucher system, and/or the gaming establishment retail system, or a mobile device application. For example, while certain data or information described herein is explained as being communicated from a component of the gaming establishment fund management system, the ticket voucher system, and/or the gaming establishment retail system to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a component of the gaming establishment fund management system, the ticket voucher system, and/or the gaming establishment retail system, such functions, features or processes may alternatively be performed by one or more servers, or one or more mobile device applications, (ii) while certain functions, features or processes are described herein as being performed by one or more mobile device applications, such functions, features or processes may alternatively be performed by one or more servers, or one or more components of the gaming establishment fund management system, the ticket voucher system, and/or the gaming establishment retail systems, (iii) while certain functions, features or processes are described herein as being performed by one or more servers, such functions, features or processes may alternatively be performed by one or more components of the gaming establishment fund management system, the ticket voucher system, and/or the gaming establishment retail systems, or one or more mobile device applications, and (iv) while certain functions, features or processes are described herein as being performed by one or more components of the gaming establishment fund management system, the ticket voucher system, and/or the gaming establishment retail system, such functions, features or processes may alternatively be performed by one or more mobile device applications, or one or more servers.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor, cause the processor to:
in association with an attempted purchase at a point-of-sale terminal of a retail system, determine, based on a balance of a gaming establishment account associated with a user and an amount of the attempted purchase, if a ticket voucher creation event occurs, and responsive to the ticket voucher creation event occurring,
cause a ticket voucher to be created, and
transfer an amount of funds associated with the amount of the purchase from the gaming establishment account to being associated with the ticket voucher.

2. The system of claim 1, wherein the ticket voucher comprises a virtual ticket voucher.

3. The system of claim 2, wherein the virtual ticket voucher is accessible via a mobile device application of a mobile device.

4. The system of claim 2, wherein when executed by the processor in association with a completion of the attempted purchase, the instructions cause the processor to cause data associated with the virtual ticket voucher to be associated with an account associated with the retail system.

5. The system of claim 1, wherein the ticket voucher comprises a paper ticket voucher and the creation of the ticket voucher comprises causing a ticket voucher printer to print the paper ticket voucher.

6. The system of claim 5, wherein when executed by the processor in association with a completion of the attempted purchase, the instructions cause the processor to cause the amount of the attempted purchase to be transferred to an account associated with the retail system.

7. The system of claim 1, wherein when executed by the processor in association with the attempted purchase at the point-of-sale terminal of the retail system, the instructions determine, based on the balance of the gaming establishment account associated with the user, the amount of the attempted purchase and an amount of a balance of a pre-paid card, if the ticket voucher creation event occurs.

8. The system of claim 7, wherein the amount of the balance of the pre-paid card is no more than a predetermined pre-paid card spending amount limit associated with the pre-paid card.

9. The system of claim 1, wherein the gaming establishment account comprises a gaming establishment retail account.

10. A system comprising:
a processor; and
a memory device that stores a plurality of instructions that, when executed by the processor, cause the processor to:
following a creation of a ticket voucher associated with an amount of funds transferred from a gaming establishment account in association with a purchase at a point-of-sale terminal of a retail system, receive, via an input device, data associated with a redemption of the ticket voucher, and
responsive to an authorization of the redemption of the ticket voucher, initiate a transfer of the amount of funds associated with the ticket voucher to an account associated with the retail system.

11. The system of claim 10, wherein part of the purchase at the point-of-sale terminal of the retail system is associated with an amount of a balance of a pre-paid card.

12. A method of operating a system, the method comprising:
in association with an attempted purchase at a point-of-sale terminal of a retail system, determining, by a processor and based on a balance of a gaming establishment account associated with a user and an amount of the attempted purchase, if a ticket voucher creation event occurs, and
responsive to the ticket voucher creation event occurring,
causing a ticket voucher to be created, and
transferring, by the processor, an amount of funds associated with the amount of the purchase from the gaming establishment account to being associated with the ticket voucher.

13. The method of claim 12, wherein the ticket voucher comprises a virtual ticket voucher.

14. The method of claim 13, wherein the virtual ticket voucher is accessible via a mobile device application of a mobile device.

15. The method of claim 13, further comprising, in association with a completion of the attempted purchase, causing data associated with the virtual ticket voucher to be associated with an account associated with the retail system.

16. The method of claim 12, wherein the ticket voucher comprises a paper ticket voucher and the creation of the ticket voucher comprises causing a ticket voucher printer to print the paper ticket voucher.

17. The method of claim 16, further comprising, in association with a completion of the attempted purchase, causing, by the processor, the amount of the attempted purchase to be transferred to an account associated with the retail system.

18. The method of claim 12, further comprising, in association with the attempted purchase at the point-of-sale terminal of the retail system, determining, by the processor and based on the balance of the gaming establishment account associated with the user, the amount of the attempted purchase and an amount of a balance of a pre-paid card, if the ticket voucher creation event occurs.

19. The method of claim 18, wherein the amount of the balance of the pre-paid card is no more than a predetermined pre-paid card spending amount limit associated with the pre-paid card.

20. The method of claim 12, wherein the gaming establishment account comprises a gaming establishment retail account.

* * * * *